United States Patent [19]
Haskins

[11] Patent Number: 5,137,237
[45] Date of Patent: Aug. 11, 1992

[54] STAR-SHAPED BASE FOR A SUPPORT STAND

[75] Inventor: Glenn M. Haskins, Carlsbad, Calif.

[73] Assignee: Pryor Products, Inc., Oceanside, Calif.

[21] Appl. No.: 638,753

[22] Filed: Jan. 8, 1991

[51] Int. Cl.⁵ .............................................. A47B 91/00
[52] U.S. Cl. .................................. 248/188.7; 248/346
[58] Field of Search ............... 248/188.7, 346, 300; 403/219, 174, 171, 176, 170

[56] References Cited

U.S. PATENT DOCUMENTS

| | | | |
|---|---|---|---|
| 3,195,196 | 7/1965 | Carisi | 403/219 |
| 4,332,378 | 6/1982 | Pryor | 248/188.7 X |
| 4,390,578 | 6/1983 | Brooks | 403/270 X |
| 4,911,391 | 3/1990 | Ellis | 248/188.7 |

Primary Examiner—Ramon O. Ramirez
Attorney, Agent, or Firm—Brown, Martin, Haller & McClain

[57] ABSTRACT

A novel star-like base design is disclosed suitable for use in a support stand intended for medical applications such as intravenous therapy or for other applications. The base is made from several identical leg sections, each joined by a single straight weld seam. The use of identical sections and identical straight weld seams simplifies base fabrication, leading to substantial cost savings.

6 Claims, 1 Drawing Sheet

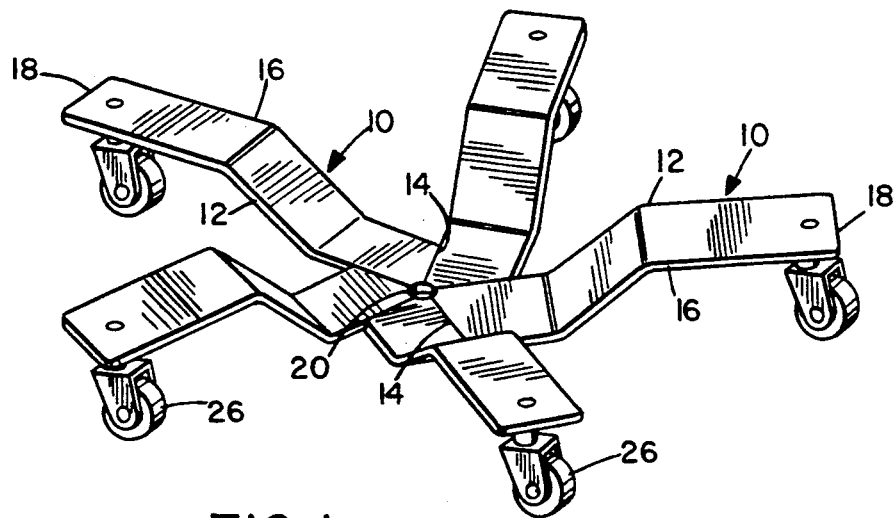
FIG. 1
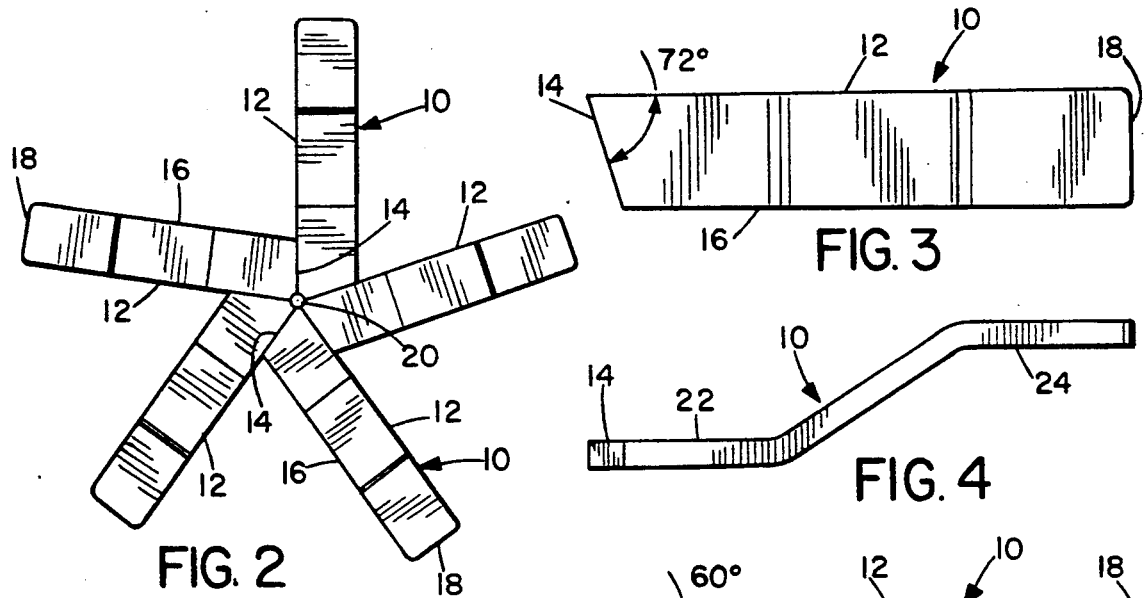
FIG. 2
FIG. 3
FIG. 4
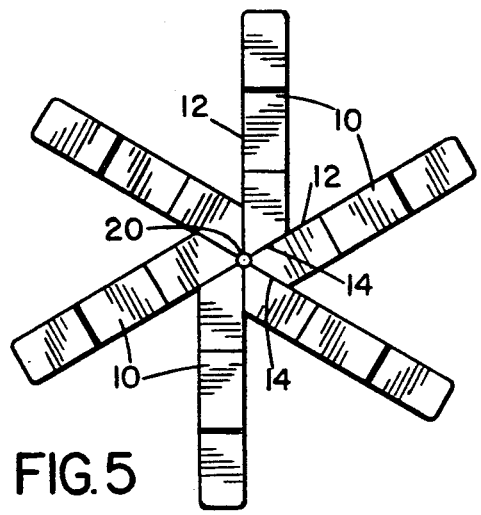
FIG. 5
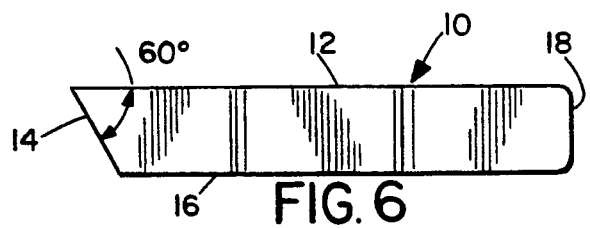
FIG. 6
FIG. 7
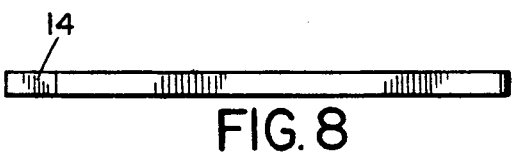
FIG. 8

STAR-SHAPED BASE FOR A SUPPORT STAND

BACKGROUND OF THE INVENTION

1. Field of the Invention

This invention involves supporting base configurations in general and, more specifically, a multi-legged base configuration for support stands used in medical and other applications.

2. Description of the Related Art

The mobile support stand is well-known in the art and has been used for many years in the medical and hospital environment. The typical mobile support stand provides a long vertical support post mounted on a broad wheeled base. The support post is often equipped with a variety of mounting means for supporting medical apparatus and therapeutic products. The wheeled base is designed to permit efficient movement from room to room while also providing firm and stable support to the central support post during use. The urgent nature of some medical care introduces a risk of tipping or upsetting of the entire support stand that must be minimized through attention to the design of the supporting base.

A number of support stand designs are known in the art that satisfy the fundamental for strength and stability requirements. An acceptable base design must provide sufficient mass to reduce the center of gravity for the fully-laden support stand below the geometric center of the stand. The base must also be sufficiently broad to resist tipping moments imposed on the support post during normal use.

Alternatively, the support stand base must permit rapid and efficient setup and use by medical personnel, rapid movement from room to room and easy access to the support post. This alternate requirement leads to a preference for a multi-legged base design over the heavier solid, round base design known in the art. The present multi-legged support base designs known in the art generally meet the requirements discussed above, but such designs are expensive and labor-intensive to manufacture. This is because of the number of different component parts required and the complexity of fabrication of a typical multi-legged stand.

The present strongly felt need for improved efficiency and reduced cost in the medical business sector has created a demand for a support stand base design of efficient and inexpensive manufacture that meets all performance requirements. This problem is solved by the present invention in the manner described below.

SUMMARY OF THE INVENTION

My invention is a star-like base configuration having several feet arranged in a symmetrical star-shaped pattern. The most important advantage of my invention is that my base may be fabricated from several identical feet by welding a single flat seam between each pair of feet. Another important advantage of my invention is that the base feet can be fabricated from flat strip stock by cutting the foot to length with a single cut made across the strip at a controlled angle. These two advantages result in a substantial reduction in fabrication costs for a base suitable for use with a support stand.

Although I prefer a base having five or six feet, my invention is not limited and may comprise three or more feet. I prefer a star-shaped base design having an interior region depressed with respect to the outer region of the base, but my invention is not necessarily limited to that configuration.

The foregoing, together with other features and advantages of the present invention, will become more apparent when referring to the following specifications, claims and accompanying drawings.

BRIEF DESCRIPTION OF THE DRAWINGS

For a more complete understanding of my invention, reference is now made to the following detailed description of the embodiments illustrated in the main drawings, wherein:

FIG. 1 shows an oblique view of a star-shaped base for a support stand having five feet;

FIG. 2 shows a plan view of a five-footed base;

FIG. 3 shows a single base foot for a five-footed base;

FIG. 4 shows a front view of the single foot from FIG. 3;

FIG. 5 shows a plan view of a six-footed base;

FIG. 6 shows a top view of a single foot for a six-footed base;

FIG. 7 shows a front view of the foot in FIG. 6; and

FIG. 8 shows the front view of a foot suitable for use in a six-footed stand without a depressed middle portion.

DESCRIPTION OF THE PREFERRED EMBODIMENTS

FIG. 1 shows an oblique view of a base for a support stand having a depressed center region, fabricated in accordance with my invention. A suitable roller may be attached at the periphery of each foot as shown in FIG. 1 to permit the base to be rolled about during use.

FIG. 2 provides a top plan view of the five-footed stand illustrated in FIG. 1. FIG. 2 shows five identical feet 10 joined together to form a five-footed stand.

FIG. 3 shows a single such foot 10 having a longitudinal edge 12 that forms an angle with a first transverse edge 14. The angular relationship between edges 12 and 14 is the only critical requirement of foot 10 in my invention. Although second longitudinal edge 16 is shown substantially parallel to first longitudinal edge 12 and second transversed edge 18 is shown substantially perpendicular to said longitudinal edges 12 and 16, these relationships may vary without affecting the critical angular relationship between edges 12 and 14.

Referring to FIG. 2, note that first longitudinal edges 12 for each of the five feet 10 are aligned radially with respect to center 20. When each of the first longitudinal edges 14 are aligned radially and the angle between edges 12 and 14 is substantially 72°, transverse edge 14 can be joined to the first longitudinal edge of the immediate adjacent food by a welded seam to form the star-shaped base shown in FIG. 2. Thus, it will be appreciated from these teachings that 5 identical feet of simple design can be joined to form a single sturdy base with five simple straight weld seams.

In FIG. 4, the side view of the foot from FIG. 3 illustrates how a foot can be shaped to form a base for a medical support stand having a center elevation 22 disposed below the surrounding peripheral elevation 24. Other variations in elevation across the star-shaped base will occur to those skilled in the mechanical arts.

FIG. 5 illustrates the top plan view of a six-footed base for a support stand made up of six identical feet of the type illustrated in FIG. 6. The only difference between the foot illustrated in FIG. 6 and the foot illustrated in FIG. 3 is the angle between first longitudinal edge 12 and first transverse edge 14. This angle must substantially be equal to 360° divided by the number of feet to be included in the star-shaped base. Since six feet are included in FIG. 5, the angle shown in FIG. 6 must be substantially 60°. Note that the assembly technique required for a six-footed stand as shown in FIG. 5 as substantially identical to that discussed for the five-footed stand shown in FIG. 2. That is, the flat joint between first longitudinal edge and the first transverse edge of the immediate adjacent foot joined by a straight welded seam. First longitudinal edge 12 of each foot is disposed radially from center 20 as mentioned above. The center 22 of the base shown in FIG. 5 can be disposed to a lower elevation from the periphery 24 by using foot 10 shaped as shown in FIG. 7. A flat base can be fabricated using the foot configuration illustrated in FIG. 8. A center mounting hole is preferred at center 20 to permit the attachment of a support post or the like to the base.

For medical applications, I prefer the use of steel as the material for my star-shaped base because of the additional weight and stability provided thereby. However, aluminum or a suitable high strength plastic may also be used. Obviously, other embodiments and modifications of the present invention will occur readily to those of ordinary skill in the art in view of these teachings. Therefore, this invention is to be limited only by the following claims, which include all such obvious embodiments and modifications when viewed in conjunction with the above specification and accompanying drawings.

I claim:

1. A base for a support stand, comprising:
    at least three feet arranged in a star shape projecting radially outwardly from a center point to an outer periphery;
    the feet being identical and each comprising a strip-like member having spaced first and second side edges, an inner end edge and an outer end edge, the inner end edge being at a predetermined acute angle to the first side edge of the strip-like member;
    the strips being positioned in a star-like pattern with said first side edges projecting radially outwardly from the center point, each inner end edge having a mating, abutting engagement with the opposite, second side edge of the next adjacent strip; and
    each strip being attached to the next adjacent strip via a single straight seam extending along the inner end edge of the strip where it abuts with the second side edge of the next adjacent strip.

2. The stand as claimed in claim 1, wherein there are n feet and the predetermined acute angle of the inner end edge of each foot is 360° divided by n.

3. The stand as claimed in claim 2, wherein there are 5 feet and the acute angle of said inner end edge of each foot is substantially 72°.

4. The stand as claimed in claim 2, wherein there are 6 feet and the acute angle of said inner end edge of each foot is substantially 60°.

5. The stand as claimed in claim 1, including at least one post mounting hole at said central point.

6. The stand as claimed in claim 1, wherein each strip-like member is bent between its ends to form parallel opposite end portions connected by an inclined center portion, the outer end portion being raised relative to the inner, central portion when the feet are connected into said star shaped pattern.

* * * * *